H. C. COLBURN.
APPARATUS FOR SEPARATING LIQUID FROM SOLID MATTER.
APPLICATION FILED JULY 23, 1913.
1,112,119.
Patented Sept. 29, 1914.
2 SHEETS—SHEET 1.
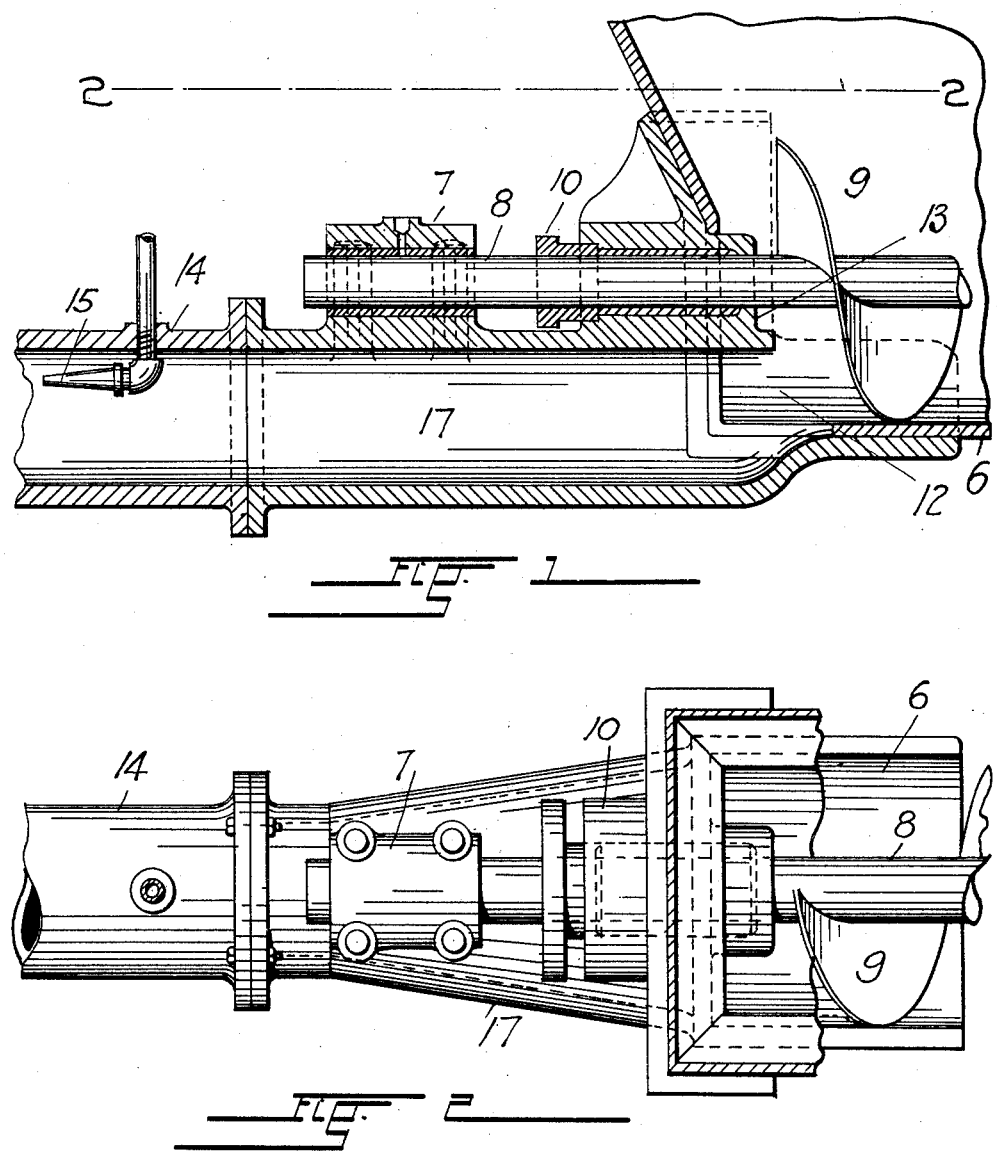
WITNESSES:
INVENTOR.
H. C. Colburn.
BY
ATTORNEY.

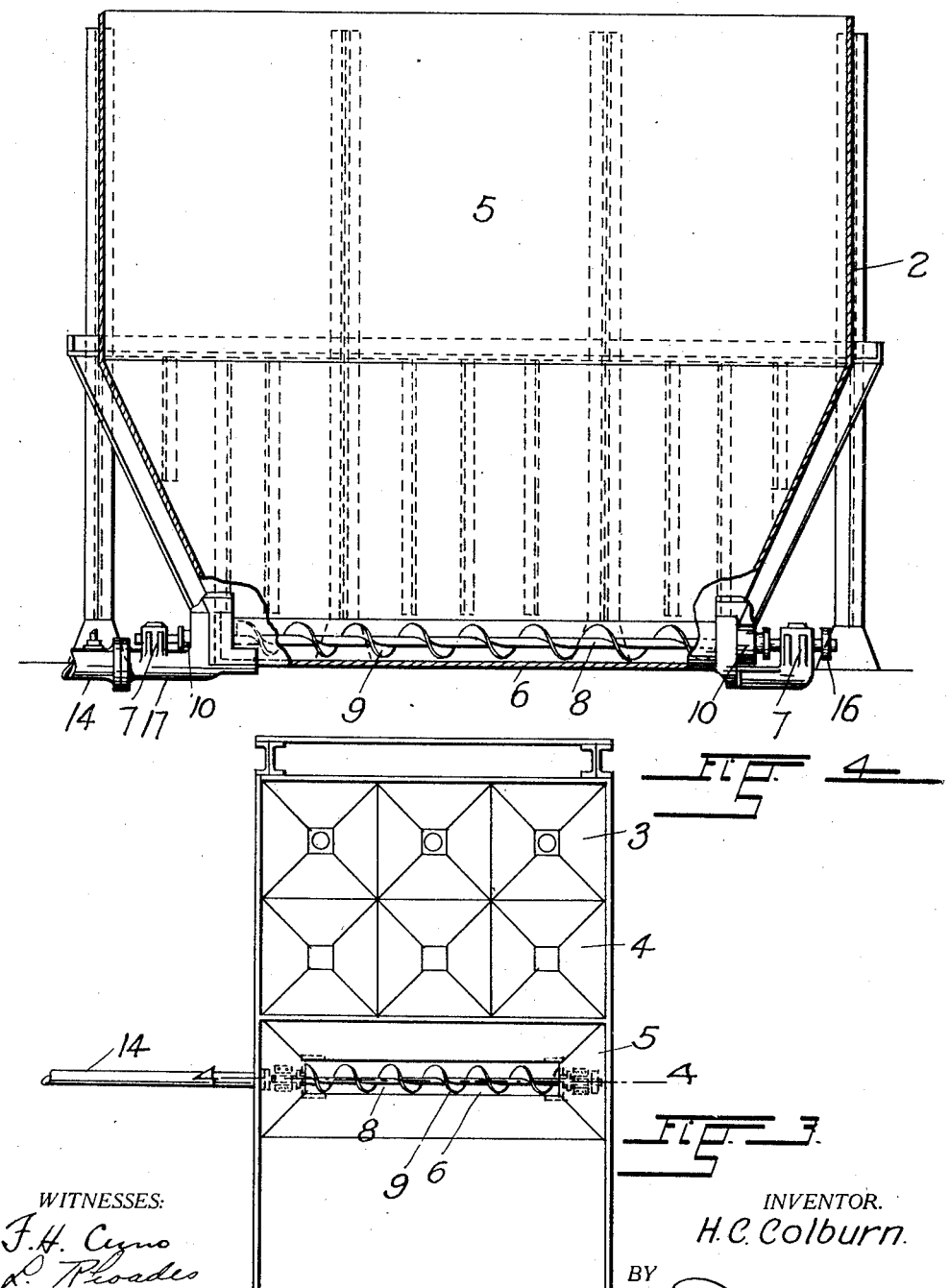

UNITED STATES PATENT OFFICE.

HERBERT C. COLBURN, OF VICTOR, COLORADO.

APPARATUS FOR SEPARATING LIQUID FROM SOLID MATTER.

1,112,119.  Specification of Letters Patent.  Patented Sept. 29, 1914.

Application filed July 23, 1913. Serial No. 780,677.

*To all whom it may concern:*

Be it known that I, HERBERT C. COLBURN, a citizen of the United States, residing at Victor, in the county of Teller and State of Colorado, have invented certain new and useful Improvements in Apparatus for Separating Liquid from Solid Matter, of which the following is a specification.

My invention relates to apparatus for separating liquid from solid matter and its primary object is to provide means whereby the greater portion of liquid contained in the pulpy residue obtained in a process of treating metalliferous ores, is automatically separated from the solid matter before the latter is discharged from the apparatus used in the practice of such process.

While my invention may be applied for different purposes it is particularly adapted to separate liquid from the tailings discharged from a filtering apparatus used in the treatment of finely slimed metallic ores by the cyanid process.

The discharge of very wet slimes from an apparatus of this character is objectionable for many reasons, principal among which is the difficulty encountered in stacking the slimes on dumps, especially on hillsides, and the consequent flow of material into streams or onto other properties.

In many mining districts the discharge of tailings into streams is prohibited by law, in which case it has been necessary to build costly dams to retain the aqueous matter at the place at which it is deposited.

By separating the greater portion of the liquid from the solids before they are discharged from the filter, I effectively obviate the difficulty above-mentioned and at the same time save the liquid for further use, which is of great importance in case the ore is treated at a point remote from a source of water supply.

In proceeding in accordance with my invention I provide at the lower end of a tank in which the pulp is contained, a transport screw which by its rotary movement impels the material toward a discharge opening which is located beyond one of its ends and out of alinement with its axis of rotation. As a result of this arrangement the pulp is by the action of the conveyer compressed against a fixed abutment whereby the water is expressed from the pulp and retained in the tank, and the solids are in a comparatively dry condition delivered into the discharge opening which connects with a conduit through which they are conveyed to the dump. In case the length of this conduit prevents the ready flow of the discharged solids, their movement may be accelerated by the application of a jet of air, steam or other fluid under pressure.

In the accompanying drawings in the various views of which like parts are similarly designated, Figure 1 represents a longitudinal, fragmentary section through the discharge end of a tank to which my invention is applied, showing the adjacent end of the screw conveyer in elevation. Fig. 2, a horizontal section taken along the line 2—2, Fig. 1, Fig. 3, a plan view in outline of a filtering apparatus showing the method of applying my invention thereto, and, Fig. 4, a section taken along the line 4—4, Fig. 3, drawn to an enlarged scale.

Referring first to Figs. 3 and 4 of the drawings the reference character 2 designates a filtering apparatus of the Moore type which, briefly, consists of a tank divided into three compartments, 3, 4 and 5 in which the metallic pulp is successively treated in a cyanid solution by the formation of a vacuum in a series of hollow filter leaves to which the solids contained in the pulp, adhere.

In the last compartment 5 the cakes formed exteriorly of the leaves are subjected to a final wash after which they are dislodged by the use of compressed air or water under pressure and discharged as tailings to be conveyed to the dump. It is to this last compartment of the tank that my invention is applied for the purposes hereinabove specified.

The tank compartment 5 has at its lower end a longitudinal, trough shaped passage 6 toward which its sides converge, and exteriorly of the closed ends of the said passage, it is provided with bearings 7 for the support of the shaft 8 of a spiral screw-conveyer 9 which is rotatably disposed within the trough.

Stuffing boxes 10 applied at the ends of the trough through which the shaft extends, are provided to maintain a fluid-tight joint around the rotating part, and a pulley 16 secured at an end of the shaft, serves as a medium for its rotation by connection with a suitable motive agent.

At the end of the trough, toward which the material contained in the compartment is impelled by the action of the conveyer, is a discharge spout 17 the orifice 12 of which is disposed beyond the end of the screw and out of alinement with its axis of rotation, to provide an abutment 13 against which the pulp impinges before it reaches the said orifice.

The spout 17 extends in the same direction in which the pulp is moved by means of the screw, whereby the resistance to the outward flow of the solids is reduced to the minimum, and by tapering the spout from its orifice 12 to its opposite extremity as shown in Fig. 2 the pressure on the slimes in the trough is increased to a considerable extent, and a greater percentage of liquid is in consequence separated from the solids before they enter said orifice.

While the tapering spout may be made cylindrical or square in cross-section, it has in practice been found that the oblong cross-sectional form of the spout shown in the drawings is best adapted for the purpose of the invention.

In case the tailings discharged through the spout are to be conveyed to a point remote from the tank through a conduit which connects with the egress thereof, as shown at 14 in Figs. 1 and 2, a nozzle 15 is disposed in the said conduit in connection with a source of fluid under pressure, such as steam or compressed air, to accelerate the flow of material and prevent the accumulation of matter in the tank by eliminating the back pressure due to the clogging of the passages and conduits through which the ore is conveyed.

In the operation of my invention the slimy substance which settles in the tank 5, enters the trough 6 and is conveyed to the discharge end thereof by the continuous rotation of the transport screw. When reaching the end of the trough it forcibly impinges against the abutment 13 and is in consequence compressed with the result that the liquid contained in the pulp is forced rearwardly with respect to the direction in which the material is impelled by the action of the screw, and retained in the tank, while the solids enter the spout 17 through its orifice in a comparatively dry condition.

Having thus described my invention what I claim and desire to secure by Letters-Patent is:

1. In apparatus of the character described, a transport screw, a passage in which said screw has a rotary movement to convey material to an end thereof, said passage having at the said end an outlet conduit and an abutment against which material conveyed by the screw, impinges before entering said conduit, and a nozzle for the injection of a fluid under pressure into the said conduit to accelerate the flow of said material.

2. In apparatus of the character described, a receptacle which at its bottom has an open trough to receive the lower portion of its contents, a transport screw rotatably mounted in the said trough, the said trough having at one of its ends a discharge opening placed out of alinement with the axis of rotation of the screw, and an abutment against which material conveyed by the screw impinges before it enters the said opening.

3. In apparatus of the character described, a receptacle the bottom of which consists of an open trough toward which its sides converge, a transport screw rotatably mounted in the said trough, the said trough having at one of its ends a discharge opening placed out of alinement with the axis of rotation of the screw, and an abutment against which material conveyed by the screw impinges before it enters the said opening.

4. In apparatus of the class described, a receptacle having at its bottom an open trough to receive the lower portion of its contents, and means for conveying material toward an end of the trough, the said trough having adjacent the said end, a discharge-opening and an abutment against which the conveyed material impinges before it passes through the said opening.

In testimony whereof I have affixed my signature in presence of two witnesses.

HERBERT C. COLBURN.

Witnesses:
E. A. COLBURN,
BERTHA L. GORICH.

---

Copies of this patent may be obtained for five cents each, by addressing the "Commissioner of Patents, Washington, D. C."